United States Patent
Uthaman et al.

(10) Patent No.: US 11,463,535 B1
(45) Date of Patent: Oct. 4, 2022

(54) USING FORENSIC TRAILS TO MITIGATE EFFECTS OF A POISONED CACHE

(71) Applicant: Amazon Technologies, Inc., Seattle, WA (US)

(72) Inventors: Karthik Uthaman, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/489,581

(22) Filed: Sep. 29, 2021

(51) Int. Cl.
*G06F 15/173* (2006.01)
*H04L 67/5682* (2022.01)
*H04L 67/561* (2022.01)
*G06F 12/0808* (2016.01)
*G06F 12/0891* (2016.01)
*H04L 67/01* (2022.01)

(52) U.S. Cl.
CPC ...... *H04L 67/2852* (2013.01); *G06F 12/0808* (2013.01); *G06F 12/0891* (2013.01); *H04L 67/2804* (2013.01); *H04L 67/42* (2013.01)

(58) Field of Classification Search
CPC . H04L 67/2852; H04L 67/2804; H04L 67/42; G06F 12/0808; G06F 12/0891
See application file for complete search history.

(56) References Cited

U.S. PATENT DOCUMENTS

| 10,262,005 | B2 | 4/2019 | Zhuang | |
|---|---|---|---|---|
| 10,951,739 | B2 | 3/2021 | Gero | |
| 2013/0028085 | A1* | 1/2013 | Bilodeau | H04L 43/16 370/235 |
| 2016/0023272 | A1* | 1/2016 | Mongillo, Jr. | B22F 5/009 219/76.12 |
| 2019/0253108 | A1* | 8/2019 | Zhang | H04B 7/0413 |
| 2022/0095144 | A1* | 3/2022 | Ren | H04W 24/02 |

* cited by examiner

*Primary Examiner* — Thanh T Nguyen
(74) *Attorney, Agent, or Firm* — Robert C. Kowert; Kowert, Hood, Munyon, Rankin & Goetzel, P.C.

(57) ABSTRACT

A content delivery network may store forensic trail metadata for cache entries in order to identify and evict poisoned cache entries, mitigating the effects of a poisoned cache due to corrupted cache servers. Each entry of a cache server may include the cached item as well as forensic metadata. The forensic metadata includes identifiers for cache servers that the item was served from, as well as a timestamp for the time that the item was served. The cache server also maintains a list of corrupted servers, as well as a time window for each corrupted server. The cache server determines, based on the list of corrupted servers and the forensic metadata, whether to evict cache entries.

21 Claims, 7 Drawing Sheets

USING FORENSIC TRAILS TO MITIGATE EFFECTS OF A POISONED CACHE

BACKGROUND

In order to provide faster responses for requested content, many content delivery providers will cache content using a hierarchy of multiple cache levels of a content delivery network, using servers that are closer to the end clients for lower cache levels. For example, a content provider may use edge servers to cache content for the lowest level cache at an edge location that is physically close to clients. If a server that caches content for a higher level cache becomes corrupted (e.g., poisoning the cache due to corrupted data), the corrupted data can flow downstream in the cache and affect many servers for lower cache levels. This may result in a large blast radius of corruption. When such an event occurs, it may not be possible or it may be extremely difficult to identify the poisoned cache entries across the servers of the cache hierarchy. A full cache wipe may be the only practical way to remove the corrupted entries. This leads to increased network usage, reduced network availability, and increased costs to clients and operators of the content delivery network.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement forensic trails to mitigate effects of a poisoned cache, according to some embodiments. In embodiments, using forensic trails may mitigate effects of a poisoned cache may reduce network downtime (e.g., of a content delivery network (CDN)) by avoiding the need to wipe a cache to remove corrupted cache entries.

In embodiments, each cache entry for an item (e.g., a content item) includes a trail of servers through which the item was served. By maintaining this trail of servers and corresponding timestamps for each cache entry, embodiments can be used to efficiently identify and invalidate and/or evict content that was served by a corrupted server. In embodiments, when a new entry for an item is cached and/or when a cache entry for the item is refreshed, a trail of servers and corresponding timestamps is included/updated as part of the cache entry.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 7 and described below.

This specification begins with a description of using forensic trails to mitigate effects of a poisoned cache. A number of different methods and techniques to implement forensic trails to mitigate effects of a poisoned cache are discussed, some of which are illustrated in accompanying flowcharts. Finally, a description of an example computing system upon which the various components, modules, systems, and/or techniques described herein may be implemented is provided. Various examples are provided throughout the specification.

Figure 1:
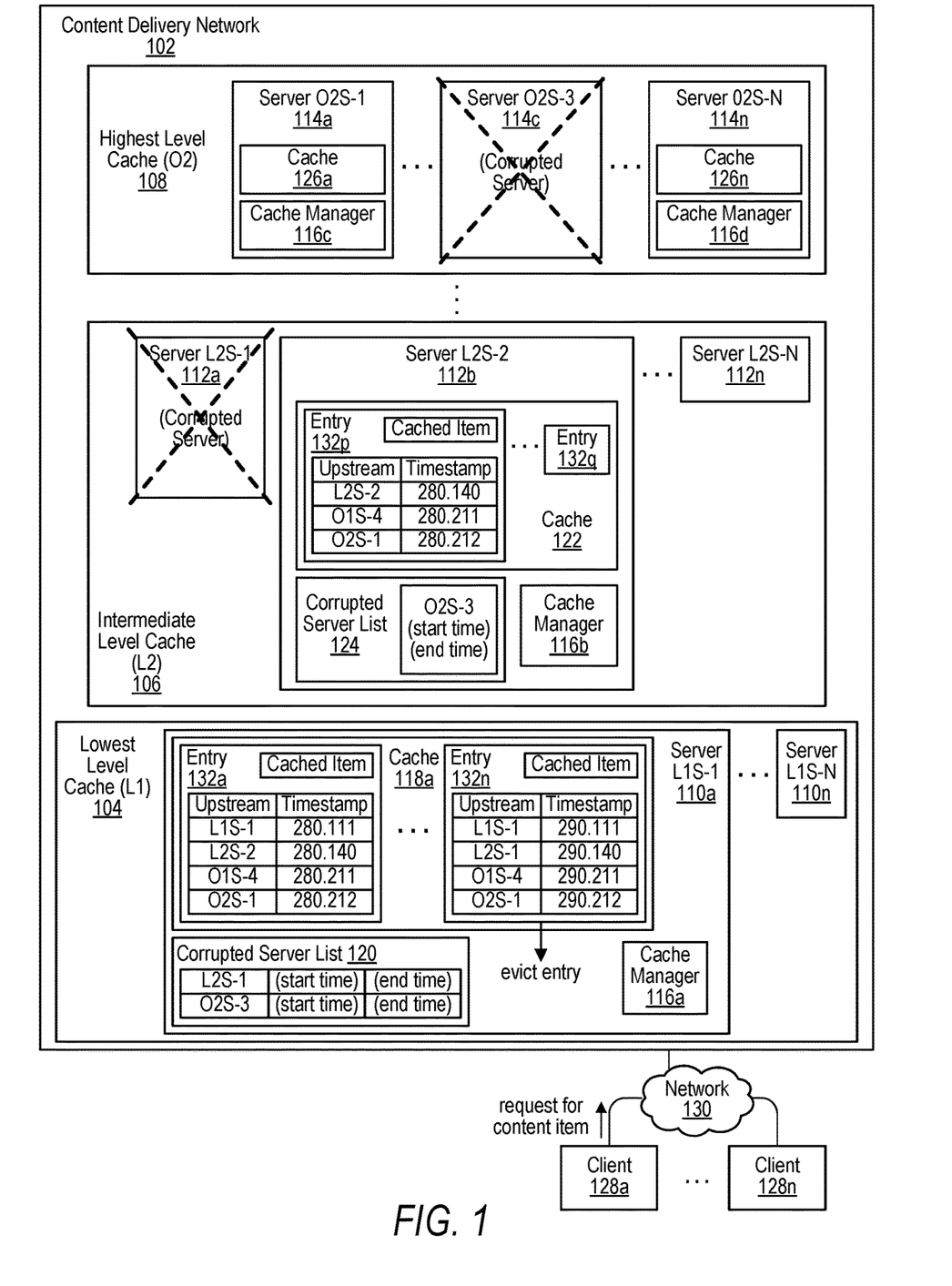
FIG. 1 is a logical block diagram illustrating a system for using forensic trails to mitigate effects of a poisoned cache, according to some embodiments.

FIG. 1 is a logical block diagram illustrating a system for using forensic trails to mitigate effects of a poisoned cache, according to some embodiments.

In the depicted embodiment, a content delivery network 102 may include a lowest level cache 104, any number of intermediate level caches 106, and a highest level cache 108 that are each implemented by any number of cache servers. In some embodiments, there may be just two cache levels (e.g., the lowest level cache 104 and the highest level cache 108).

As shown, the servers 110 are used for the lowest level cache 104, the servers 112 are used for the intermediate level cache 104, and the servers 114 are used for the highest level cache 114. Each server includes a cache manager 116 that may perform any of the functions described herein for the servers and/or the caches. For example, the cache manager 116a of the server 110a may generate and/or process requests and/or responses, receive and/or send data from or to other servers, add/evict/update entries in the cache 118a of the server 110a, and add/remove/update entries in the corrupted server list 120 of the server.

Each of the servers 112 of the intermediate level cache 106 also include a cache 122 and a corrupted server list 124.

Similarly, each of the servers 114 of the highest level cache 108 include a cache 126. In the depicted embodiment, the servers 114 of the highest level cache 108 do not include a corrupted server list because there is not a higher level of cache and therefore no corrupted data can be received by the servers 114 from a higher level cache. However, in some embodiments, each of the servers 114 of the highest level cache 108 may include a corrupted server list to store entries for any of the servers 114 that were corrupted (e.g., as a backup list that may be accessed by servers in lower-level caches to update their own corrupted server list, if necessary).

In the example embodiment, any number of client devices 128 may send requests via wide area network 130 (e.g., the internet) for content items to the content delivery network 102. For example, the client device 128a may send a request for a content item to the content delivery network 102, which is routed to the lowest level cache 104.

In various embodiments, a client device 128 may be any computing device that submits a request for an item to the content delivery network 102 and/or receives a response from the content delivery network 102 that includes the requested item. For example, a user of the client device may submit the request and/or receive the response via a graphical user interface (GUI) of an application running on the client device. In embodiments, any number of client devices may belong to and/or be managed by any number of clients of the content delivery network 102 (e.g., users, companies, or other organizations).

Figure 3:
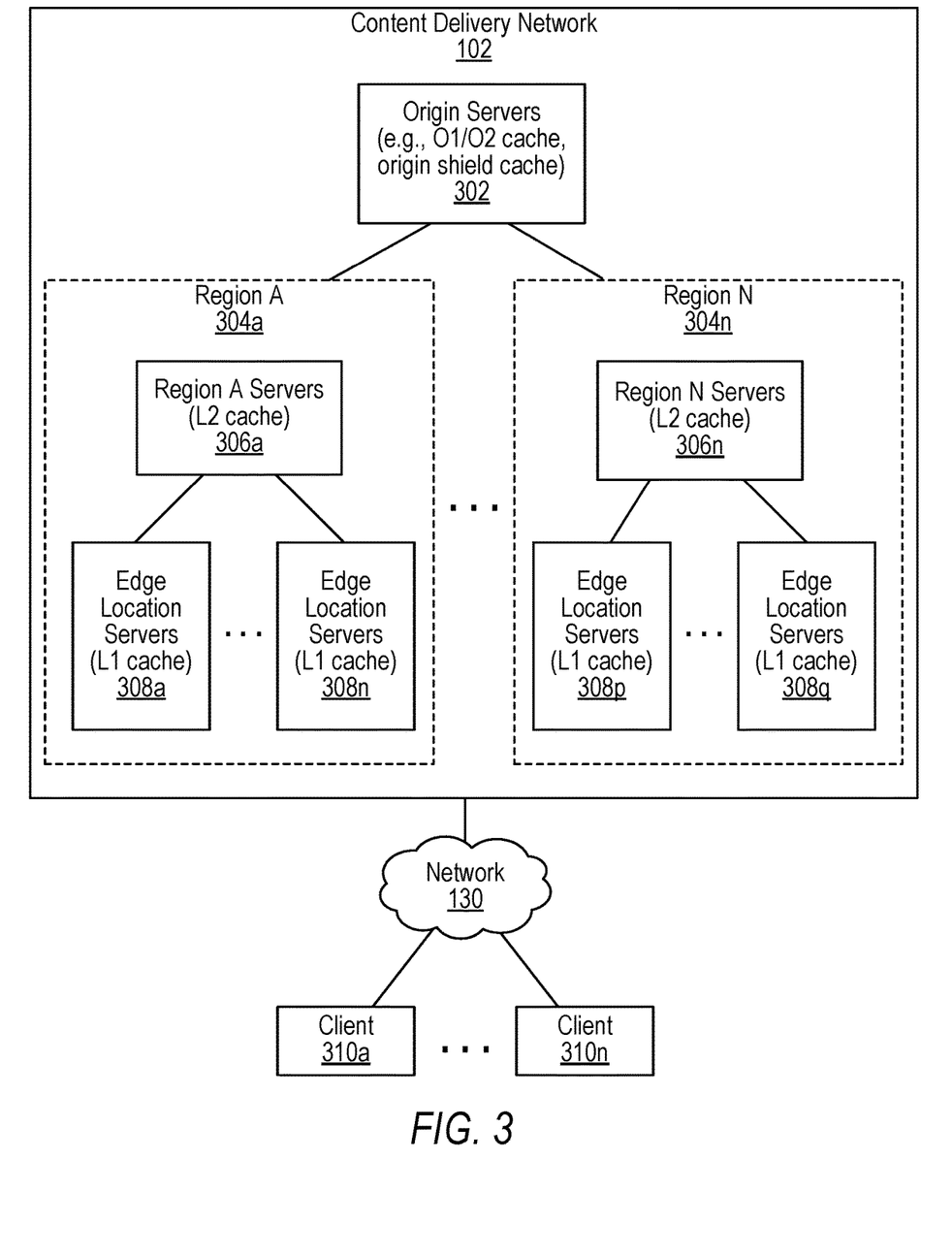
FIG. 3 is a logical block diagram illustrating different regions of a content delivery network that each include regional servers for a higher level cache and edge locations that each include edge location servers for a lower level cache, according to some embodiments.

In embodiments, different servers for any number of the cache levels may be located at any number of different physical locations/areas. For example, a portion of the servers 110 for the lowest level cache 104 and a portion of the servers 112 for the intermediate level cache 106 may be located at a data center (e.g., edge location) of the content delivery network and another portion of the servers 110 for the lowest level cache 104 and another portion of the servers 112 for the intermediate level cache 106 may be remotely located at another data center (e.g., another edge location) of the content delivery network. FIG. 3 depicts another example of how different servers may be distributed across different geographical areas.

Each cache 118 of a server may include any number of cache entries 132. As shown, each cache entry may include a cached item and forensic metadata (e.g., a forensic trail). The forensic metadata for a cached item indicates, for respective cache levels of the higher cache levels: an identifier of a particular server that the item (and/or response) was served from (e.g., in response to a request for the item); and a timestamp indicating a time that the item (and/or response) was served from the particular server. For example, the forensic metadata for cache entry 132a indicates that the item of cache entry 132a was served from server L1S-1 110a at time 280.111, the item was served from server L2S-2 112b at time 280.140, the item was served from server O1S-4 at time 280.211 (from an intermediate level cache not shown), and the item was served from server O2S-1 114a at time 280.212. Note that in embodiments, the head of a response from a server (e.g., a response form a higher level server) may include the forensic metadata (forensic trails) for the requested item.

Although the forensic metadata for entry 132a and entry 132n includes metadata for the server itself (L1S-1), in some embodiments, this part of the forensic metadata may be omitted and/or not used because it is not be needed in order to determine whether an upstream server was corrupted. Similarly, in some embodiments, the forensic metadata for entry 132p may not include the metadata for the server itself (L2S-2). In embodiments, each cache entry may include any other amount/type of metadata (e.g., version of the cache entry/file, URL of the cache file, size of the cached item).

In embodiments, the entries of the corrupted server list of a given server indicate each of the servers of any higher level caches that were corrupted and a time associated with the each of the servers that were corrupted (e.g., a time window of corruption indicated by a start time for when the server became corrupted and an end time after which the server was no longer corrupted). For example, the corrupted server list 120 includes an entry that identifies the server L2S-1 112a that was corrupted from a particular start time to particular end time and includes an entry that identifies the server O2S-3 114c that was corrupted from a particular start time to particular end time.

In embodiments, the lowest level cache 104 may receive, from a client (e.g., client 128a), a request for an item. In response, the lowest level cache 104 may determine that the item does not exist in the lowest level cache. In response to this determination, the lowest level cache 104 may request the item from a higher level cache (e.g., from the intermediate level cache 106).

If the higher level cache has a cache entry for the requested item, it will return the item and associated metadata (e.g., forensic trails) to the lowest level cache (e.g., as part of a response). If not, then the request will propagate up to as many cache levels as necessary in order for the intermediate level cache to retrieve the requested item and associated metadata from the higher cache levels before returning the response.

The lowest level cache then receives the response. The response may include the requested item and at least the forensic metadata for the item. The lowest level cache may then store the item and at least the forensic metadata as a cache entry for the item in the lowest level cache (e.g., by the cache manager of the server 110a). The lowest level cache (e.g., the cache manager) may determine, based at least on the lowest level list of corrupted servers (e.g., corrupted server list 120) and the forensic metadata for the item (e.g., the item of cache entry 132n), whether to evict the cache entry for the item from the lowest level cache.

In various embodiments, the determination of whether to evict the cache entry may be performed after storing the retrieved cache entry 132n (e.g., in response to storing the cache entry) or the determination of whether to evict the cache entry may be performed at a later point in time (e.g., in response to a trigger/condition that initiates batch eviction for multiple entries, or in response to a cache hit for the cache entry/item).

In embodiments, a server may perform batch eviction for multiple cache entries (e.g., in response to a trigger/condition). In an embodiment, performing a batch eviction may include determining, for multiple entries (or all entries) of the server cache (e.g., cache 118a), whether to evict the cache entry. For example, the server 110a may determine whether to evict the cache entry from the lowest level cache according to a schedule (e.g., every 5 minutes, 60 minutes, etc.) or in response to an event (e.g., receiving an indication of at least one additional corrupted server for a higher level cache and a time associated with the at least one additional corrupted server).

To perform a batch eviction, a server (e.g., server 110a) may, for respective cache entries stored in the server cache (e.g., cache 118a): determine, based on the identifiers of the servers for the respective cache levels, the timestamp for the servers, and the respective times associated with the corrupted servers indicated by the list of corrupted servers (e.g., list 120), whether the item of the cache entry was served from a corrupted server. In response to determining that the item was served from a corrupted server, the server (e.g., server 110*a*) may evict the cache entry. Otherwise, the server may not evict the cache entry.

For example, in response to the server (e.g., cache manager 116*a*) determining that the time indicated by the timestamp for server L2S-1 (290.140) is within the time window indicated by the entry for the server L2S-1 of the corrupted server list 120 (e.g., within the time window indicated by the start time and the end time), then the server 110*a* may determine that the item of cache entry 132*n* was served from a corrupted server and in response, evict the cache entry 132*n*.

In some embodiments, a server may perform "lazy" eviction of cache entries. For example, a server (e.g., server 110*a*) may receive a client request for an item. In response to receiving the request, the server may determine that the item exists in the cache (e.g., in the lowest level cache) and/or that the item is not stale (e.g., the time to live (TTL) for the item has not expired). In response to determining that the item exists in the lowest level cache and/or that the item is not stale, the server may determine, based at least on the list of corrupted servers (e.g., list 120) and the forensic metadata for the item (e.g., the item of entry 132*n*), whether to evict the cache entry for the item from the cache. For example, the server 110*a* may determine to evict the cache entry 132*n* due to determining that the item was served from a corrupted server, as described above.

In various embodiments, batch eviction may be triggered by a server in response to receiving, by the server, an indication of one or more corrupted servers from one or more higher levels of the cache and a time associated with each of the corrupted servers (e.g., start/end time for a corruption window). In response to receiving the indication of the corrupted server(s) and the associated time(s), the server may determine, based on the list of corrupted servers and/or the received indication of the corrupted server(s) and the associated time(s), whether to evict some or all of the cache entries of the server cache.

In some embodiments, any number of the servers of the content delivery network 102 may perform both batch eviction and lazy eviction (e.g., at different times, depending on one or more conditions/criteria). For example, if the load/usage on a server is high (e.g., above a threshold load/usage based on one or more measured metrics), then the server may operate in a lazy eviction mode. In the lazy eviction mode, the server performs lazy eviction instead of batch eviction in order to reduce the load/usage on the server during peak/high usage periods. If the load/usage on the server is low (e.g., below the threshold load/usage based on one or more measured metrics), then the server may operate in a batch eviction mode. In the batch eviction mode, the server performs batch eviction instead of lazy eviction in order to take advantage of the available resources of the server during off-peak/low usage periods.

In embodiments, a server may receive an indication of an additional corrupted server for a higher level cache and a time associated with the additional corrupted server (e.g., start/end time for a corruption window). In response, the server may add an additional entry to the list of corrupted servers that indicates the additional corrupted server and the time associated with the additional corrupted server to generate an updated list of corrupted servers. The server may then use the updated list of corrupted servers to perform batch eviction and/or lazy eviction, as described herein.

Figure 2:
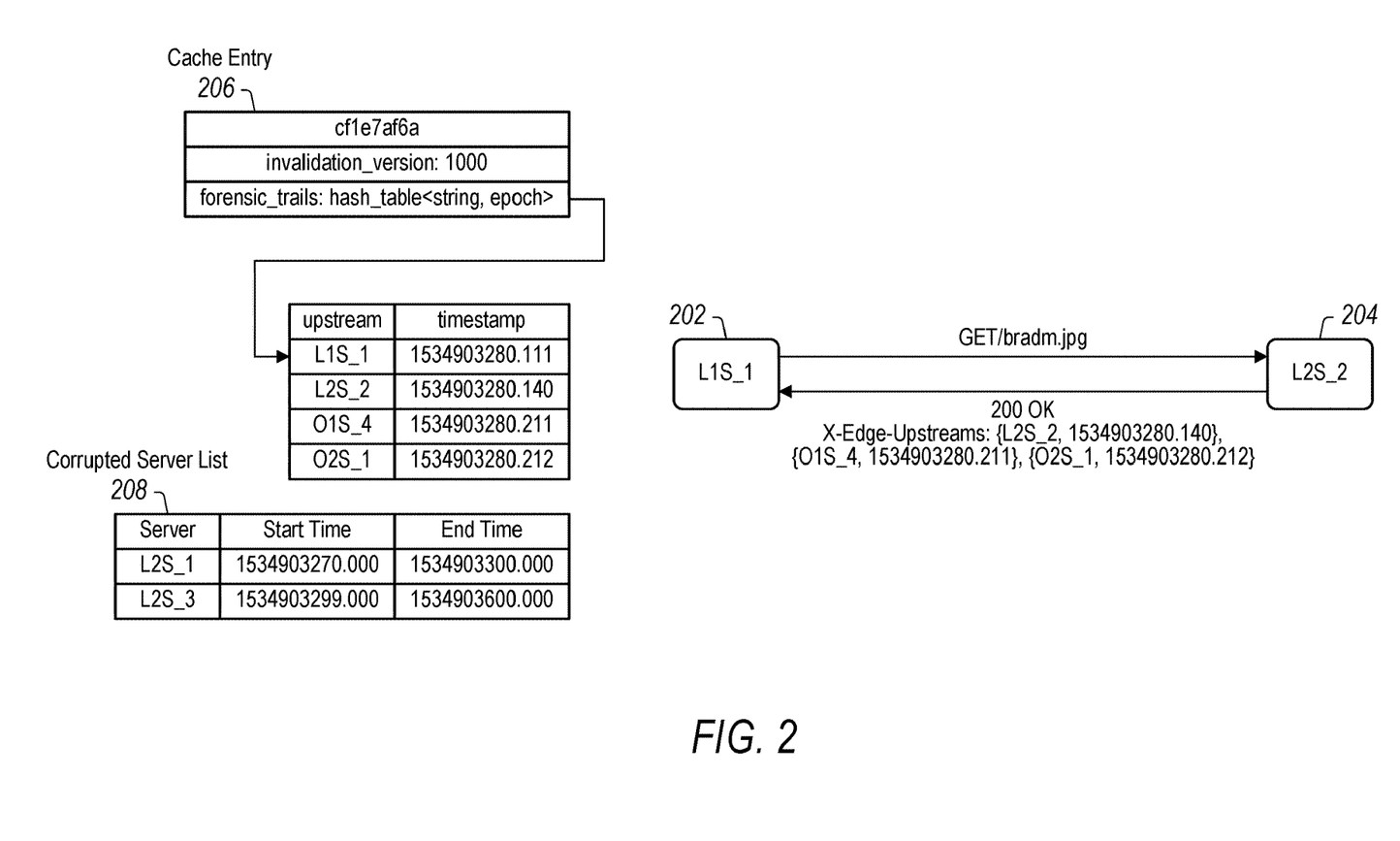
FIG. 2 is a logical block diagram illustrating a cache entry and a corrupted server list that are used to mitigate effects of a poisoned cache, according to some embodiments.

FIG. 2 is a logical block diagram illustrating a cache entry and a corrupted server list that are used to mitigate effects of a poisoned cache, according to some embodiments.

In the example embodiment, a lower level cache server 202 requests an item (the file bradm.jpg) from a higher level cache server 204 and the higher level cache server 204 returns a response (a 200 response) that includes a response header with a portion of the header labeled "X-Edge-Upstreams." The portion includes an indication/identifier of a cache server and a corresponding time for three different cache servers. The portion indicates that the item was served from server O2S-1 at a particular time, the item was served from server O1S-4 at another particular time, and the item was served from server L2S-2 at another particular time.

As shown, the server L1S-1 generates a hash key for the cache entry 206 (cf1e7af6a). In embodiments, the hash key may be generated using a hashing algorithm with one or more portions of the response and/or request. In some embodiments, a unique identifier may be generated/assigned to the cache entry instead of a cache key.

As shown, the cache entry includes the hash key and pointer to a hash table that stores the forensic trails metadata for the content entry/item. In the example embodiment, the L1S-1 server also stores a corrupted server list 208 that includes two entries. Since neither entry matches any of the timestamps of the forensic trail, the cache entry will not be evicted based on the corrupted server list. In various embodiments, the data and/or metadata may be stored in any type of suitable data structure other than a hash table (e.g., list, table, object, bloom filter).

FIG. 3 is a logical block diagram illustrating different regions of a content delivery network that each include regional servers for a higher level cache and edge locations that each include edge location servers for a lower level cache, according to some embodiments.

In the example embodiment, a content delivery network 102 includes any number of origin servers 302 in one or more data centers. The origin servers may implement any number of cache levels (e.g., an O1 level and an O2 level). The content delivery network also includes different regions 304 that each include any number of region servers 306 that implement an L2 cache. In some embodiments, the origin servers 302 may be located outside of the CDN 102 and implement an origin "shield" cache that may obtains data from an origin server located outside of the CDN 102 (e.g., at a separate network and/or remote network). For example, the regional cache (e.g., L2 cache of the region servers 306) may request content from an origin shield cache of server(s) located outside of the CDN 102. The origin shield cache may request content from an origin server(s) that are also located outside of the CDN 102. In an embodiment, the origin servers 302 within the CDN 102 may host an origin shield cache that requests content from an origin server located outside of the CDN 102. In some embodiments, this may provide an additional layer of security/protection for data at the origin and/or shield cache.

As depicted, each of the region server(s) communicates with different remote edge locations 308 in the same region (e.g., remote data centers/remote networks with edge servers). Each edge location includes an L1 cache 104. In embodiments, the content in each L2 cache is based on (e.g., provided by) content stored at the origin servers.

In embodiments, a region may be defined by a geographical area or other suitable grouping characteristic. For example, the region A servers 306*a* and/or the edge locations 308*a*, 308*n* may be located in the same geographical area (e.g., city, state, country, or other defined location).

As shown, any number of clients 310 may send requests for content (e.g., objects) over a wide area network (e.g., the Internet 130) to any number of respective edge locations. Each edge location may receive requests from a different group of any number of clients and route the requests to the L1 cache at the edge location.

In embodiments, the edge location servers and/or the region servers may implement any number of cache levels. For example, in some embodiments, the edge location servers may implement an L1 cache (lowest level cache) and an L2 cache (higher level cache) and the region servers may implement an L3 cache (higher level cache).

Figure 4:
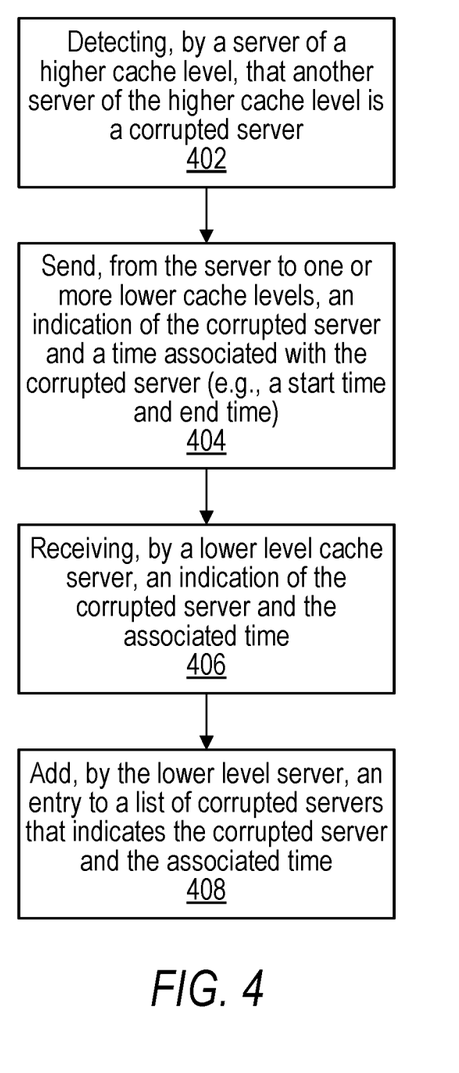
FIG. 4 is a high-level flowchart illustrating various methods and techniques to provide an indication of a corrupted cache server to lower levels of a cache, according to some embodiments.

FIG. 4 is a high-level flowchart illustrating various methods and techniques to provide an indication of a corrupted cache server to lower levels of a cache, according to some embodiments.

Figure 5:
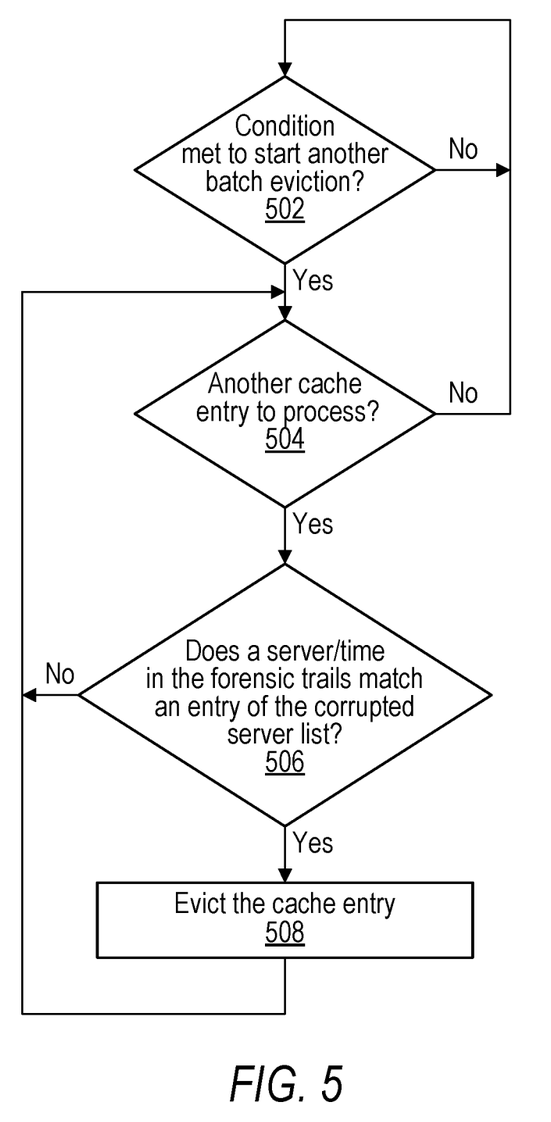
FIG. 5 is a high-level flowchart illustrating various methods and techniques to implement a system for using forensic trails to mitigate effects of a poisoned cache by performing a batch eviction, according to some embodiments.
Figure 6:
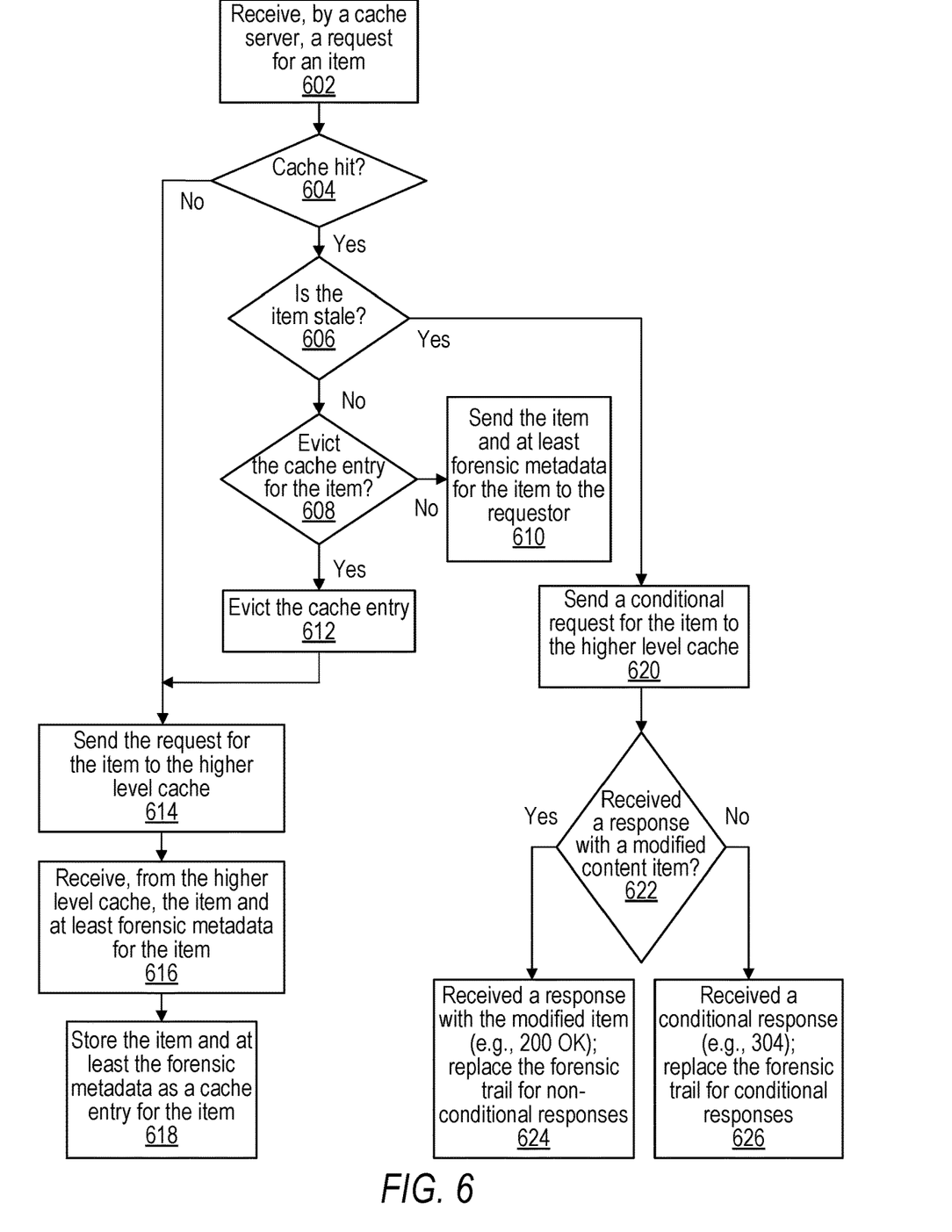
FIG. 6 is a high-level flowchart illustrating various methods and techniques to implement a system for using forensic trails to mitigate effects of a poisoned cache by performing lazy eviction, according to some embodiments.

These techniques, as well as the techniques discussed with regard to FIGS. 5-6, may be implemented using components or systems as described above with regard to FIGS. 1-3, as well as other types of components or systems, and thus the following discussion is not intended to be limiting as to the other types of systems that may implement the described techniques.

As indicated at block 402, a server of a higher cache level (e.g., L2) may detect and/or determine that another server of the higher cache level (L2) is a corrupted server for a particular window of time (e.g., with a start time and an end time). At block 404, the server may send, to one or more lower cache levels (e.g., L1), an indication of the corrupted server and a time associated with the corrupted server (e.g., start and end times).

At block 406, a lower level cache server (L1 server) receives the indication of the corrupted server and the associated time. At block 408, the lower level cache server adds an entry to a list of corrupted servers that indicates the corrupted server and the associated time.

FIG. 5 is a high-level flowchart illustrating various methods and techniques to implement a system for using forensic trails to mitigate effects of a poisoned cache by performing a batch eviction, according to some embodiments.

At block 502, a cache server determines whether a condition is met to start a batch eviction. If not, then the server continues monitoring for the condition at block 502. If so, then at block 504, the server determines whether there is another cache entry to process. If not, then the process returns to block 502.

If the server determines whether there is another cache entry to process, then at block 506, the server determines whether a server/timestamp of the forensic metadata for the cache entry matches an entry of the corrupted server list. If not, then the process returns to block 504. If so, then at block 508, the cache server evicts the cache entry. The process then returns to block 504.

FIG. 6 is a high-level flowchart illustrating various methods and techniques to implement a system for using forensic trails to mitigate effects of a poisoned cache by performing lazy eviction, according to some embodiments.

At block 602, a cache server receives a request for an item. At block 604, the server determines whether there is a cache hit (whether there is a cache entry for the item). If so, then at block 606 the server determines whether the item is stale (e.g., the TTL for the item has expired). If not, then at block 608, the server determines whether to evict the cache entry (e.g., based on the forensic metadata for the cache entry and the corrupted server list, as described herein).

If the server determines not to evict the cache entry, then at block 610, the server sends the item and at least the forensic meta data to the requestor (e.g., to the lower level cache server that requested the item or to the client that requested the item). If the requestor is the client that requested the item (e.g., the cache server is the lowest level server), then the server may send the item to the client without sending the forensic metadata and/or other metadata. If the server determines to evict the cache entry, then at block 612, the server evicts the cache entry. The process then proceeds to block 614, where the server sends the request for the item to the higher level cache (e.g., higher level cache server).

At block 616, the server receives, form the higher level cache, the item and at least the forensic metadata for the item (any amount of other metadata for the cache entry may also be received). At block 618, the server stores the item and at least the forensic metadata as a cache entry for the item. The server may also send the item and/or at least the forensic metadata for the item to the requestor (e.g., the lower level cache or the client).

Returning to block 604, if the server determines that there is not a cache hit (e.g., a cache miss), then at block 614, the server sends the request for the item to the higher level cache (e.g., higher level cache server). From there, the process proceeds to blocks 616 and 618, as described above.

Returning to block 606, if the server determines that the item is stale, then at block 620, the server sends a conditional request for the item to the higher level cache. At block 622, the server determines whether a response with a modified content item was received (e.g., whether a 200 OK response was received). If so, then at block 624, the server replaces the forensic trail/metadata for non-conditional responses with a new forensic trail/metadata included in the response (e.g., a different server ID/timestamp for a server at each cache level) and/or may store the modified/updated item into the cache entry. The modified item may be returned to the requestor.

Returning to block 622, if the server determines that a response with a modified content item was not received (e.g., a conditional response was received), then at block 626, the server replaces the forensic trail/metadata for conditional responses (e.g., 304) with a new forensic trail/metadata included in the conditional response (e.g., a different server ID/timestamp for a server at each cache level), the item/entry may be refreshed (e.g., reset the TTL counter), and/or the item may be returned to the requestor. By maintaining a separate forensic trail for non-conditional responses (e.g., 200 responses) and conditional responses (e.g., 304 responses) and replacing the corresponding trail when a stale content item is replaced or refreshed, the server limits the length/size of the forensic trail for each item.

Without using the above technique, if an item is stale, the content delivery network could possibly go through different upstream servers each time the item is requested and therefore add an additional list of servers to the forensic metadata each time. This may result in long forensic trails, increasing the time required by the server to determine whether a content item is corrupted. By maintaining and replacing two separate trails, the above scenario is avoided.

For example, for a lowest cache level server of a content delivery network with 10 cache levels, each forensic trail will be limited to only 10 entries for 10 servers. In some embodiments, only one forensic trail for non-conditional responses (e.g., 200 responses) may be maintained/replaced as described above (e.g., no trails for 304 responses are used). In some embodiments, only one forensic trail for conditional responses (e.g., 304 responses) may be maintained/replaced as described above (e.g., no trails for 200 responses are used). Note that when the server determines for the first time that an object is stale and that the object has not been modified (e.g., a conditional "not modified" response is received), then the server stores the forensic trail for the conditional response without the need to replace any existing forensic trail for conditional responses.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may implement the functionality described herein (e.g., the functionality of the caches, cache managers, and other components that implement the techniques described herein). The various methods as illustrated in the figures and described herein represent example embodiments of methods. The order of any method may be changed, and various elements may be added, reordered, combined, omitted, modified, etc.

Figure 7:
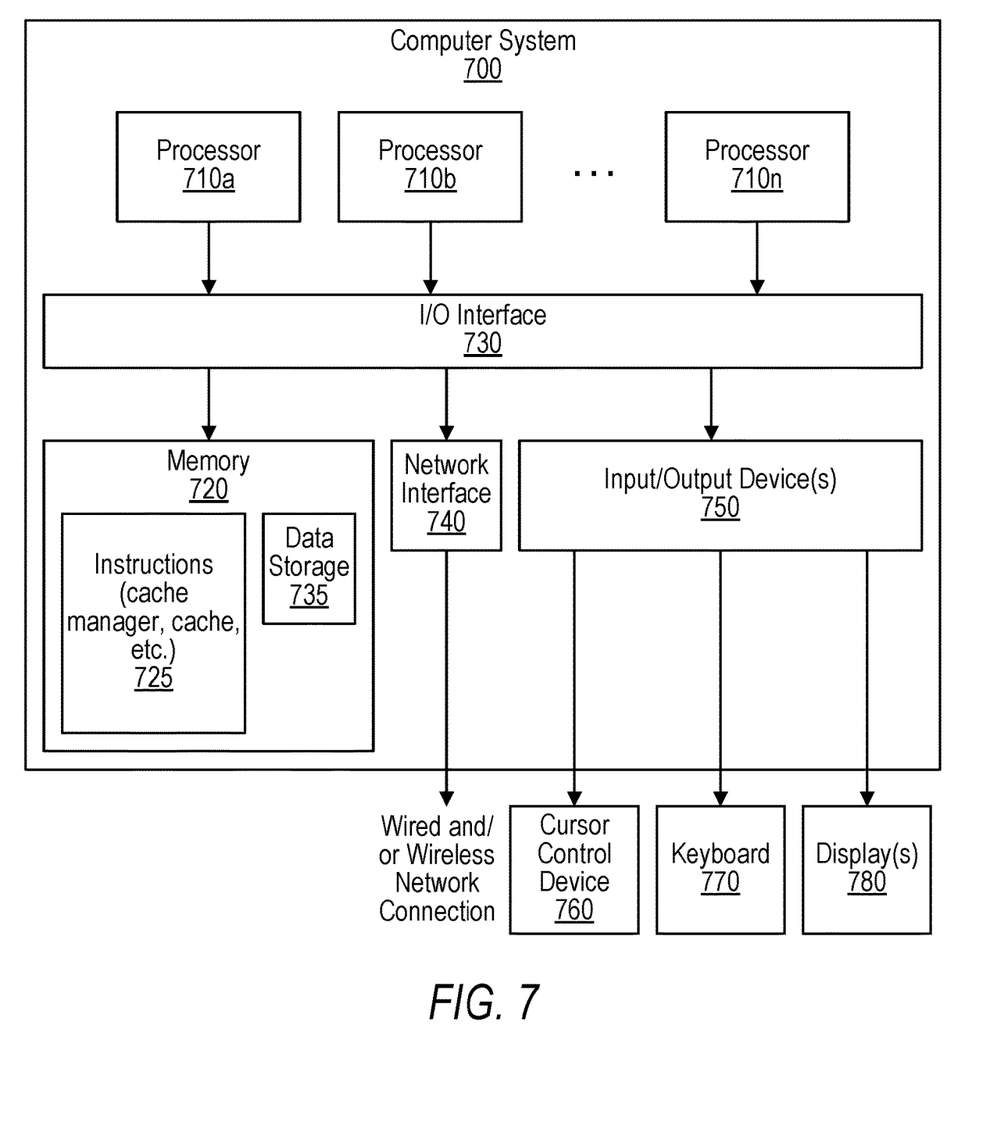
FIG. 7 is a block diagram illustrating an example computing system, according to some embodiments.

Embodiments to implement intelligent forensic trails to mitigate effects of a poisoned cache, which may interact with various other systems or devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) may include standard computer monitor(s) and/or other display systems, technologies or devices, in one embodiment. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions, in one embodiment. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 720 may store program instructions 725 and/or data accessible by processor 710, in one embodiment. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., cache, cache manager, etc.) are shown stored within system memory 720 as program instructions 725 and data storage 735, respectively. In other embodiments, program instructions and/or data may be received, sent or stored upon different types of computer-accessible media or on similar media separate from system memory 720 or computer system 700. A computer-accessible medium may include non-transitory storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740, in one embodiment.

In one embodiment, I/O interface 730 may be coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700, in one embodiment. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700, in one embodiment. Multiple input/output devices 750 may be present in computer system 700 or may be distributed on various nodes of computer system 700, in one embodiment. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, that implement the various embodiments of the systems as described herein, and data store 735, comprising various data accessible by program instructions 725, in one embodiment. In one embodiment, program instructions 725 may include software elements of embodiments as described herein and as illustrated in the Figures. Data storage 735 may include data that may be used in embodiments (e.g., cache entries, forensic metadata, items, corrupted server list, etc.). In other embodiments, other or different software elements and data may be included.

Those skilled in the art will appreciate that computer system 700 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 700 may be transmitted to computer system 700 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  a plurality of lowest level servers for a lowest level cache of a content delivery network, wherein the lowest level servers are configured to store a lowest level list of corrupted servers, wherein individual entries of the lowest level list indicate:
    a corrupted server for a higher level cache or a highest level cache of the content delivery network and a time associated with the corrupted server for the higher level cache or the highest level cache;
  a plurality of intermediate level servers for at least one intermediate level cache, wherein intermediate level servers of a given intermediate level cache are configured to store an intermediate level list of corrupted servers, wherein individual entries of the intermediate level list indicate:
    a corrupted server for a higher intermediate level cache or the highest level cache of the content delivery network and a time associated with the corrupted server for the higher intermediate level cache or the highest level cache;
  a plurality of highest level servers for the highest level cache;
  wherein a given lowest level server of the plurality of lowest level servers is configured to:
    in response to receipt of a client request for an item, determine that the item does not exist in the lowest level cache; and
    in response to the determination that the item does not exist in the lowest level cache, request the item from a particular one of the at least one intermediate level caches;
    receive a response from the particular intermediate cache, wherein the response comprises the item and at least forensic metadata for the item, wherein the forensic metadata for the item indicates, for respective cache levels of the at least one intermediate level cache and the highest level cache:
- an identifier of a particular server that the item was served from; and
- a timestamp indicating a time that the item was served from the particular server;

store the item and at least the forensic metadata as a cache entry for the item in the lowest level cache; and determine, based at least on the lowest level list of corrupted servers and the forensic metadata for the item, whether to evict the cache entry for the item from the lowest level cache.

2. The system of claim 1, wherein to determine, based at least on the lowest level list of corrupted servers and the forensic metadata for the item, whether to evict the cache entry for the item from the lowest level cache, the given lowest level server is configured to:

for respective cache entries of a plurality of cache entries stored in the lowest level cache:
- determine, based on the identifier of the particular servers for the respective cache levels, the timestamp for the particular servers, and the respective times associated with the corrupted servers indicated by the lowest level list of corrupted servers, whether the item of the cache entry was served from a corrupted server; and
- in response to a determination that the item of the cache entry was served from a corrupted server, evict the cache entry.

3. The system of claim 2, wherein the time indicated by the individual entries of the lowest level list of corrupted servers comprises a time window indicated by a start time and an end time, and wherein to determine that the item of the cache entry was served from a corrupted server, the given lowest level server is configured to:

determine that a time indicated by the timestamp for one of the particular servers is within the time window indicated by one of the entries of the lowest level list of corrupted servers that matches the particular server.

4. The system of claim 1, wherein the given lowest level server is configured to:

determine whether to evict the cache entry from the lowest level cache according to a schedule, or in response to reception of an indication of at least one additional corrupted server for the higher level cache or the highest level cache and a time associated with the at least one additional corrupted server, determine whether to evict the cache entry from the lowest level cache, wherein the determination is further based on the indication of the at least one additional corrupted server and the time associated with the at least one additional corrupted server.

5. The system of claim 1, wherein the given lowest level server is configured to:

in response to reception of an indication of at least one additional corrupted server for the higher level cache or the highest level cache and a time associated with the at least one additional corrupted server, add at least an additional entry to the lowest level list of corrupted servers that indicates the at least one additional corrupted server and the time associated with the at least one additional corrupted server to generate an updated lowest level list of corrupted servers;

in response to receipt of another client request for the item, determine that the item exists in the lowest level cache; and in response to the determination that the item exists in the lowest level cache, determine, based at least on the updated lowest level list of corrupted servers and the forensic metadata for the item, whether to evict the cache entry for the item from the lowest level cache;

and wherein to determine, based at least on the lowest level list of corrupted servers and the forensic metadata for the item, whether to evict the cache entry for the item from the lowest level cache, the given lowest level server is configured to:

for respective cache entries of a plurality of cache entries stored in the lowest level cache:
- determine, based on the identifier of the particular servers for the respective cache levels, the timestamp for the particular servers, and the respective times associated with the corrupted servers indicated by the updated lowest level list of corrupted servers, whether the item of the cache entry was served from a corrupted server; and
- in response to the determination of whether the item of the cache entry was served from a corrupted server, evict the cache entry or leave the cache entry in the lowest level cache.

6. A method, comprising:

performing, by a lower level server for a lower level cache of a plurality of cache levels of a content delivery network:
- receiving a client request for an item;
- in response to receiving the client request for the item, determining that the item does not exist in the lower level cache;
- in response to determining that the item does not exist in the lower level cache, requesting the item from a higher level server for a higher level cache of the content delivery network;
- receiving a response from the higher level server, wherein the response comprises the item and at least forensic metadata for the item, and wherein the forensic metadata for the item indicates, for respective cache levels of the plurality of cache levels:
  - an identifier of a particular server that the item was served from; and
  - a timestamp indicating a time that the item was served from the particular server;
- storing the item and at least the forensic metadata as a cache entry for the item in the lower level cache;
- receiving an indication of at least one corrupted server for the higher level cache or another higher level cache of the content delivery network and a time associated with the at least one corrupted server;
- in response to receiving the indication of the at least one corrupted server and the associated time, generate a list of corrupted servers that indicates at least one entry for the at least one corrupted server and the associated time; and
- determining, based at least on the list of corrupted servers and the forensic metadata for the item, whether to evict the cache entry for the item from the lower level cache.

7. The method of claim 6, wherein determining, based at least on the list of corrupted servers and the forensic metadata for the item, whether to evict the cache entry for the item from the lower level cache comprises:

for respective cache entries of a plurality of cache entries stored in the lower level cache:
   determining, based on the identifier of the particular servers for the respective cache levels, the timestamp for the particular servers, and the respective times associated with the at least one corrupted server, whether the item of the cache entry was served from a corrupted server; and
   in response to determining that the item of the cache entry was served from a corrupted server, evict the cache entry.

8. The method of claim 7, wherein the time associated with the at least one corrupted server comprises a time window indicated by a start time and an end time, and wherein determining that the cache entry was served from a corrupted server comprises:
   determining that a time indicated by the timestamp for one of the particular servers is within the time window indicated by one of the entries of the list of corrupted servers that matches the particular server.

9. The method of claim 6, further comprising:
   in response to receiving an indication of an additional corrupted server for at least the higher level cache or another higher level cache of the content delivery network and a time associated with the additional corrupted server, determining, based at least on the list of corrupted servers and the forensic metadata for the item, whether to evict the cache entry for the item from the lower level cache.

10. The method of claim 6, further comprising:
   determining whether to evict the cache entry for the item from the lower level cache according to a schedule.

11. The method of claim 6, further comprising:
   receiving an indication of an additional corrupted server for at least the higher level cache or another higher level cache of the content delivery network and a time associated with the additional corrupted server; and
   in response to receiving the indication of the additional corrupted server and a time associated with the additional corrupted server, add an additional entry to the list of corrupted servers that indicates the additional corrupted server and the time associated with the additional corrupted server to generate an updated list of corrupted servers.

12. The method of claim 6, further comprising:
   in response to receiving another client request for the item, determining that the item exists in the lower level cache; and
   in response to determining that the item exists in the lower level cache, determining, based at least on the list of corrupted servers and the forensic metadata for the item, whether to evict the cache entry for the item from the lower level cache.

13. The method of claim 6, wherein determining whether to evict the cache entry for the item from the lower level cache comprises:
   for respective cache entries of a plurality of cache entries stored in the lower level cache:
      determining, based at least on the timestamps for the particular servers for the respective cache levels indicated by the forensic metadata and the respective times associated with the at least one corrupted server, whether the item of the cache entry was served from a corrupted server; and
      in response to determining whether the item of the cache entry was served from a corrupted server, determine whether to evict the cache entry;

and wherein the method further comprises:
   receiving another client request for the item;
   in response to receiving the other client request for the item, determining that the item exists in the lower level cache;
   in response determining that the item exists in the lower level cache, determining, based at least on the list of corrupted servers and the forensic metadata for the item, whether to evict the cache entry for the item from the lower level cache.

14. The method of claim 6, further comprising:
   in response to receiving another client request for the item, determining that the item exists in the cache entry in the lower level cache and is stale;
   in response to determining based on the other client request that the item exists in the lower level cache and is stale, sending a conditional request to the higher level cache;
   receiving from the higher level cache a conditional response that indicates the item has not been modified, wherein the conditional response comprises other forensic metadata for the item, and wherein the other forensic metadata for the item indicates, for respective cache levels of the plurality of cache levels, an identifier of a server of the cache level and a timestamp for the server of the cache level;
   in response to receiving the conditional response, adding the other forensic metadata to the cache entry;
   in response to receiving an additional client request for the item, determining that the item exists in the cache entry in the lower level cache and is stale;
   in response to determining based on the additional client request that the item exists in the lower level cache and is stale, sending another conditional request to the higher level cache;
   receiving from the higher level cache another conditional response that indicates the item has not been modified, wherein the other conditional response comprises new forensic metadata for the item, and wherein the new forensic metadata for the item indicates, for respective cache levels of the plurality of cache levels, an identifier of a server of the cache level and a timestamp for the server of the cache level;
   in response to receiving the other conditional response, replacing the other forensic metadata of the cache entry with the new forensic metadata.

15. One or more non-transitory computer-accessible storage media storing program instructions that when executed on or across one or more processors of a lower level server of a lower level cache of a content delivery network cause the one or more processors to:
   receive a client request for an item;
   in response to the reception of the client request for the item, determine that the item does not exist in the lower level cache;
   in response to the determination that the item does not exist in the lower level cache, request the item from a higher level server for a higher level cache of the content delivery network;
   receive a response from the higher level server, wherein the response comprises the item and at least forensic metadata for the item, and wherein the forensic metadata for the item indicates, for respective cache levels of the plurality of cache levels:
      an identifier of a particular server that the item was served from; and a timestamp indicating a time that the item was served from the particular server;

store the item and at least the forensic metadata as a cache entry for the item in the lower level cache; and determine, based at least on a list of corrupted servers stored by the lower level server and the forensic metadata for the item, whether to evict the cache entry for the item from the lower level cache.

16. The one or more storage media as recited in claim 15, wherein to determine, based at least on a list of corrupted servers stored by the lower level server and the forensic metadata for the item, whether to evict the cache entry for the item from the lower level cache, the program instructions when executed on or across the one or more processors cause the one or more processors to:

for respective cache entries of a plurality of cache entries stored in the lower level cache:
determine, based on the identifier of the particular servers for the respective cache levels, the timestamp for the particular servers, and the respective times associated with the at least one corrupted server, whether the item of the cache entry was served from a corrupted server; and
in response to a determination that the item of the cache entry was served from a corrupted server, evict the cache entry.

17. The one or more storage media as recited in claim 16, wherein the time associated with the at least one corrupted server comprises a time window indicated by a start time and an end time, and wherein to determine that the cache entry was served from a corrupted server, the program instructions when executed on or across the one or more processors further cause the one or more processors to:

determine that a time indicated by the timestamp for one of the particular servers is within the time window indicated by one of the entries of the list of corrupted servers that matches the particular server.

18. The one or more storage media as recited in claim 15, wherein the program instructions when executed on or across the one or more processors further cause the one or more processors to:

in response to reception of an indication of an additional corrupted server for at least the higher level cache or another higher level cache of the content delivery network and a time associated with the additional corrupted server, determine, based at least on the list of corrupted servers and the forensic metadata for the item, whether to evict the cache entry for the item from the lower level cache.

19. The one or more storage media as recited in claim 15, wherein the program instructions when executed on or across the one or more processors further cause the one or more processors to:

in response to reception of an additional client request for the item, determine that the item exists in the cache entry in the lower level cache and is stale;

in response to the determination that the item exists in the lower level cache and is stale, send a conditional request to the higher level cache;

receive from the higher level cache an additional response that comprises a modified version of the item, wherein the additional response comprises new forensic metadata for the item, and wherein the new forensic metadata for the item indicates, for respective cache levels of the plurality of cache levels, an identifier of a server of the cache level and a timestamp for the server of the cache level; and in response to the reception of the additional response, replace the forensic metadata of the cache entry with the new forensic metadata.

20. The one or more storage media as recited in claim 15, wherein the program instructions when executed on or across the one or more processors further cause the one or more processors to:

in response to reception of another client request for the item, determine that the item exists in the lower level cache; and
in response to the determination that the item exists in the lower level cache, determine, based at least on the updated list of corrupted servers and the forensic metadata for the item, whether to evict the cache entry for the item from the lower level cache.

21. The one or more storage media as recited in claim 15, wherein to determine whether to evict the cache entry for the item from the lower level cache, the program instructions when executed on or across the one or more processors cause the one or more processors to:

for respective cache entries of a plurality of cache entries stored in the lower level cache:
determine, based at least on the timestamps for the particular servers for the respective cache levels indicated by the forensic metadata and respective times associated with at least one corrupted server of the list of corrupted servers, whether the item of the cache entry was served from a corrupted server; and
in response to the determination of whether the item of the cache entry was served from a corrupted server, evict the cache entry or leave the cache entry in the lowest level cache;

and further comprising program instructions that when executed on or across the one or more processors cause the one or more processors to:
in response to reception of another client request for the item, determine that the item exists in the lower level cache; and
in response to the determination that the item exists in the lower level cache, determine, based at least on the list of corrupted servers and the forensic metadata for the item, whether to evict the cache entry for the item from the lower level cache.

* * * * *